US012181111B2

(12) United States Patent
Al Ayesh et al.

(10) Patent No.: US 12,181,111 B2
(45) Date of Patent: Dec. 31, 2024

(54) SYSTEM AND METHOD FOR FACILITATING HYDROCARBON FLUID FLOW

(71) Applicant: SAUDI ARABIAN OIL COMPANY, Dhahran (SA)

(72) Inventors: Ahmed H. Al Ayesh, Dhahran (SA); Sameeh Batarseh, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 833 days.

(21) Appl. No.: 17/246,122

(22) Filed: Apr. 30, 2021

(65) Prior Publication Data

US 2022/0349529 A1 Nov. 3, 2022

(51) Int. Cl.
*H05B 6/64* (2006.01)
*F17D 1/18* (2006.01)
*H05B 6/68* (2006.01)

(52) U.S. Cl.
CPC ............. *F17D 1/18* (2013.01); *H05B 6/6447* (2013.01); *H05B 6/6491* (2013.01); *H05B 6/68* (2013.01); *H05B 2214/03* (2013.01)

(58) Field of Classification Search
CPC ........... C10G 15/08; C10G 32/02; F17D 1/16; F17D 1/18; H05B 2214/03; H05B 6/6447; H05B 6/6491; H05B 6/68
(Continued)

(56) References Cited

U.S. PATENT DOCUMENTS 3,420,938 A * 1/1969 Ekdahl ...................... C03B 5/26
373/84
6,112,808 A * 9/2000 Isted ....................... E21B 28/00
166/66.5
(Continued)

FOREIGN PATENT DOCUMENTS

CA 2819657 C 10/2016
SU 1496015 A1 7/1989
(Continued)

OTHER PUBLICATIONS

Othman, Haitham A., and Mohamed Y. Soliman, "SPE-188130-MS Combining Microwave and Activated Carbon for Oilfield Applications: Thermal-Electromagnetic Analysis of Activated Carbon", Paper presented at the SPE Kingdom of Saudi Arabia Annual Technical Symposium and Exhibition, Dammam, Saudi Arabia, Apr. 2017 (16 pages).
(Continued)

*Primary Examiner* — Quang T Van
(74) *Attorney, Agent, or Firm* — Osha Bergman Watanabe & Burton LLP

(57) ABSTRACT

Systems for facilitating fluid flow including a tubular segment having a length, a tube wall with a thickness, a tube wall exterior surface, and a tube wall interior surface are described. The tube wall interior surface defines a conduit configured to permit fluid flow along the length of the tubular segment. The tube wall may include a material configured to convey heat energy through the tube wall and at least one heating element coupled to an exterior surface of the tube wall along the length of the tubular segment, at least one heating element made of an enabler material configured to receive electromagnetic energy, convert the electromagnetic energy into heat energy, and release the heat energy into the tube wall. The system may include a source of electromagnetic energy associated with the at least one
(Continued)

heating element. The source of electromagnetic energy is configured to transmit electromagnetic energy into the heating element.

18 Claims, 6 Drawing Sheets

(58) Field of Classification Search
USPC ....... 219/679, 680, 681, 687, 710, 678, 542; 166/247, 248, 249, 275, 302, 303, 234, 166/45, 57; 373/84
See application file for complete search history.

(56) References Cited

U.S. PATENT DOCUMENTS

| | | | | |
|---|---|---|---|---|
| 8,362,407 | B2 * | 1/2013 | Coffey | C03B 19/106 422/177 |
| 2002/0028070 | A1 | 3/2002 | Holen | |
| 2007/0089785 | A1 | 4/2007 | Perry | |
| 2010/0294489 | A1 | 11/2010 | Dreher, Jr. et al. | |
| 2013/0206748 | A1 * | 8/2013 | Vinegar | E21B 36/04 219/542 |
| 2016/0053595 | A1 | 2/2016 | Nguyen et al. | |
| 2016/0097001 | A1 | 4/2016 | Tam et al. | |
| 2017/0122476 | A1 | 5/2017 | Diaz et al. | |
| 2020/0088019 | A1 | 3/2020 | Batarseh et al. | |

FOREIGN PATENT DOCUMENTS

| | | | |
|---|---|---|---|
| WO | 2014171960 | A1 | 10/2014 |
| WO | 2014189533 | A1 | 11/2014 |

OTHER PUBLICATIONS

T. Holst et al., "OTC-26936-MS Direct Electrical Heating of a Flexible Pipe", Paper presented at the Offshore Technology Conference, Houston, Texas, USA, May 2016 (9 pages).
International Search Report Issued in Corresponding Applicaiton No. PCT/US2022/025575, Issued on Jul. 11, 2022, 4 pages.
Written Opinion Issued in Corresponding Applicaiton No. PCT/US2022/025575, Issued on Jul. 11, 2022, 6 pages.

* cited by examiner

SYSTEM AND METHOD FOR FACILITATING HYDROCARBON FLUID FLOW

BACKGROUND

Pipeline transportation and mobilization of hydrocarbons, such as heavy crude oil and bitumen, is an essential element in the hydrocarbon production line. Hydrocarbons tend to have a complex composition and high molecular weight, resulting in low mobility and high viscosity. Transporting hydrocarbons, particularly heavy hydrocarbons, is an expensive and energy intensive process due to the low mobility and high viscosity of the hydrocarbons. Commercially available options to transporting hydrocarbons include tanker shipments by rail, tanker truck, or barge, diluting of the heavy oil for pipeline transportation, and viscosity reduction by visbreaking for pipeline transportation.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed relate to a system for facilitating hydrocarbon fluid flow. The system may include a tubular segment having a length, a tube wall with a thickness, a tube wall exterior surface, and a tube wall interior surface. The tube wall interior surface defines an interior fluid conduit configured to permit the flow of a hydrocarbon fluid along the length of the tubular segment. The tube wall may also include a material that is configured to convey heat energy through the tube wall and at least one heating element coupled to an exterior surface of the tube wall along the length of the tubular segment. The system may also include at least one heating element. The heating element may also include an enabler material that is configured to receive electromagnetic energy, convert the electromagnetic energy into heat energy, and release the heat energy into the tube wall. The system may also include at least one source of electromagnetic energy associated with the at least one heating element, where the at least one source of electromagnetic energy is configured to transmit electromagnetic energy into the associated at least one heating element.

In another aspect, embodiments disclosed relate to a method of facilitating hydrocarbon fluid flow. The method may include introducing a hydrocarbon fluid into a tubular segment of a system for facilitating hydrocarbon fluid flow and detecting a first temperature of the hydrocarbon fluid using a sensor in an interior fluid conduit of the tubular segment. The method may also include determining a first viscosity of the hydrocarbon fluid in the interior fluid conduit using the detected first temperature and determining an amount of electromagnetic energy for raising the temperature of the hydrocarbon fluid from a first temperature to a target temperature, where the target temperature is greater than the first temperature. The method may also include transmitting electromagnetic energy from at least one source of electromagnetic energy into an associated at least one heating element such that the temperature of the hydrocarbon fluid is raised downstream of the at least one heating element.

Other aspects and advantages of the claimed subject matter will be apparent from the following description and the appended claims.

Figure 1:
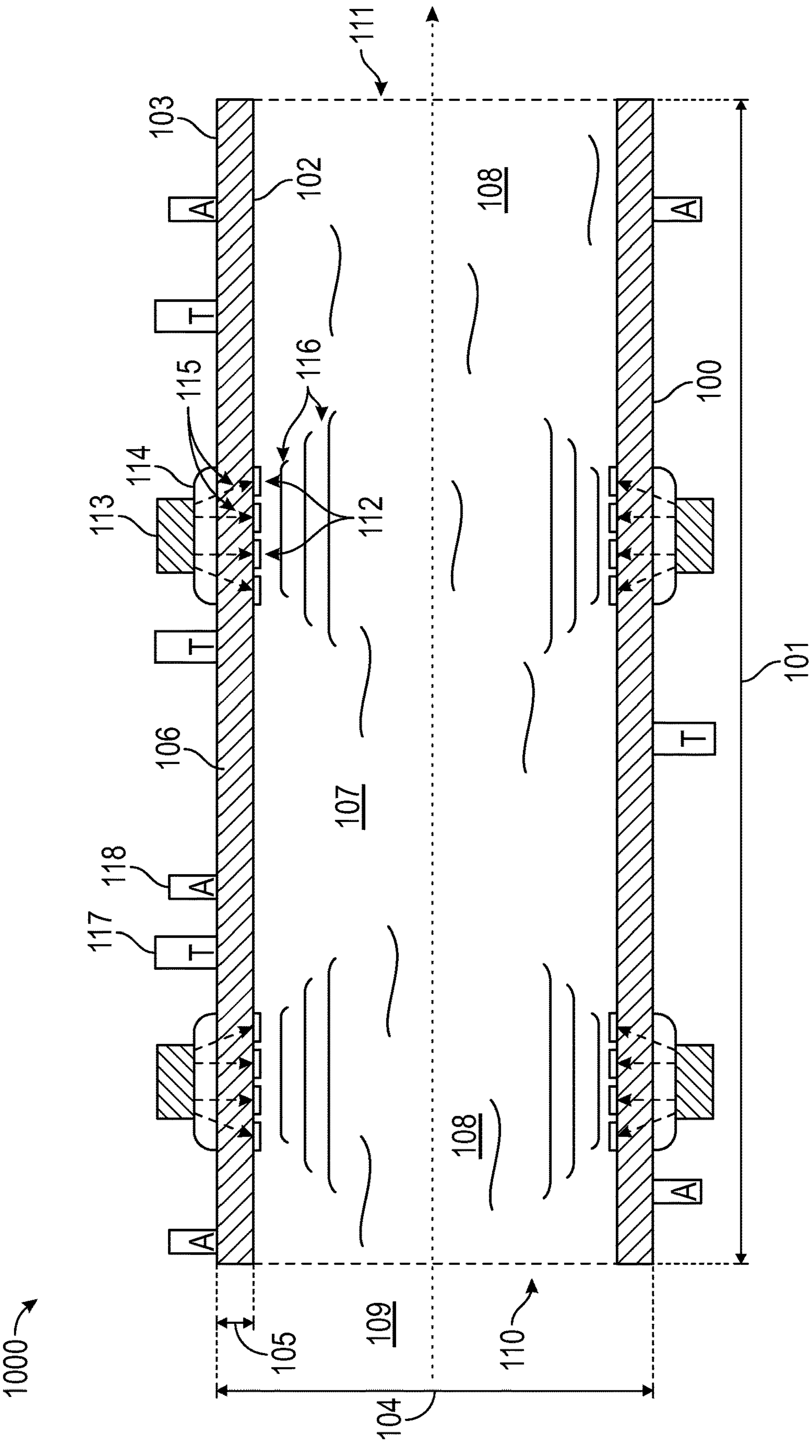
FIG. 1 shows an illustration in a partial reveal view of a pipeline segment for heating a hydrocarbon fluid.

The use of the "'" symbol represents the same material, object, or system but in a different operational or property state, such as temperature. All other aspects (except those related to the change of state) are considered the same.

DETAILED DESCRIPTION

Transporting hydrocarbons from a recovery site to the refineries may require high operational, logistical, and energy costs. Hydrocarbons, such as crude oil, bitumen, and other heterogeneous mixtures of compounds recovered from sources such as reservoirs, are conventionally transported through pipelines for processing into viable products for the global market. While pipelines may be a convenient mode of hydrocarbon transportation, it is useful to increase the mobility of the hydrocarbon fluid in the pipeline. Hydrocarbon mobility may be impacted by the hydrocarbon temperature at reservoir conditions, subterranean pipeline conditions, and the reduction in hydrocarbon temperature through heat loss in the pipelines. The low temperature and potential subsequent reduced temperature of a hydrocarbon as it passes through a pipeline increases the viscosity of the hydrocarbon by multiple orders of magnitude. Transportation of highly viscous hydrocarbon fluids through pipelines may require high pressure differentials in the pipeline to mobilize the hydrocarbon. Pipeline pressure differentials are conventionally induced via pumps and pumping pressure. The energy, operational, and logistical cost of pumping highly viscous hydrocarbon fluids through pipelines reduces the economic viability of these viscous hydrocarbons.

Conventional methods for viscosity reduction for a heavy hydrocarbon fluid include blending the hydrocarbon fluid with diluents, chemical alteration of the hydrocarbon composition, and visbreaking techniques at the wellsite surface facilities. Other conventional techniques of lowering a hydrocarbon viscosity include direct heating via energy such as electrical energy. Such conventional techniques suffer from additional high operational, logistical, and energy costs that impact the economic viability of transporting the hydrocarbon.

Systems and methods may be used to reduce viscosity of a fluid and improve the fluid mobility by controlling (increasing) the temperature of the fluid. The viscosity of hydrocarbons may be reduced by increasing the temperature of the hydrocarbon, thus and easing mobilization of a hydrocarbon fluid through transportation systems, such as pipelines.

Embodiments of the present disclosure are directed at heating of a hydrocarbon fluid (such as heavy crude oil) inside a structure, such as a tubular segment, and more specifically, a pipeline segment. In particular, the temperature of the hydrocarbon fluid may be increased by heat radiated from an intermediary, where the intermediary may be heated by electromagnetic waves (electromagnetic energy) from an electromagnetic transmitter (EM transmitter).

Embodiments of the present disclosure may be useful as part of a pipeline system. Pipeline systems transport large quantities of fluids over long distances. The fluids may be hazardous fluids, such as hydrocarbons, and may also include natural gas. Pipeline systems may collect products from sources, such as wellsites on land (gathering lines) or offshore, or from shipping, such as tankers for oil or liquefied natural gas (LNG). The pipeline systems conventionally move the product to storage or processing (such as treatment for gas or refining of petroleum), or both. Pipeline systems may also deliver heavy hydrocarbons to distant refineries or refined products to distant markets, such as airports or to depots where fuel oils and gasoline are loaded into trucks for local delivery. Pipeline systems may include pump stations for fluids, compressor stations for storage, and distribution facilities and automated control facilities to manage the product movement and maintain safety. Embodiments of the present disclosure may alleviate the power load and number of pump stations necessary to create the required pressure differential to mobilize the fluid through the pipeline system.

Embodiments disclosed may reduce the viscosity of a hydrocarbon contained within an interior chamber of a pipeline. Embodiments may increase the hydrocarbon mobility by decreasing the hydrocarbon viscosity via indirect heat from an enabler material, the enabler material heated by electromagnetic energy, such as electromagnetic radiation. In some embodiments of the present disclosure, the methods and systems may transmit electromagnetic energy to a heating element comprising an enabler material, thereby increasing the temperature of the enabler material. The heating element may be coupled or connected to a pipeline material that may contain a hydrocarbon. The heat energy from the heating element may increase the temperature of the pipeline material containing the hydrocarbon. In some embodiments of the present disclosure, the heating element may be in direct contact with a hydrocarbon contained in the pipeline, thereby directly heating the hydrocarbon. The increase in the temperature of the hydrocarbon may decrease the viscosity of the hydrocarbon, thereby facilitating fluid mobilization of the hydrocarbon and decreasing the pumping pressure required to mobilize the hydrocarbon in the pipeline.

FIG. 1 shows an illustration in a partial reveal view of a pipeline system 1000 for heating a hydrocarbon fluid. FIG. 1 shows a pipeline segment 100 with a length 101, an interior surface 102, an exterior surface 103, a diameter 104, and a tube wall 106 having a thickness 105. The interior surface 102 along the length 101 defines an interior flow conduit 107 through which the hydrocarbon fluid 108 may traverse or flow (arrow) 109 from entry 110 through the pipeline segment 100 to exit 111.

As seen in FIG. 1, there are one or more heating elements 112 made of enablement material that are coupled or connected to pipeline segment 100 along the length 101 of the interior surface 102 of the pipeline segment 100. In FIG. 1, associated with each heating element 112 is an EM transmitter 113 with an antenna 114 mounted on the exterior surface 103 of the pipeline segment 100 proximate and relative to the position along the interior surface 102 of the heating element 112. EM radiation (dashed arrows) 115, also referred to as electromagnetic energy, is transmitted from the associated EM transmitter 113 and its antenna 114, through the pipeline segment 100, and into the heating elements 112. Heat waves (curves) 116 are shown emanating from several of the heating elements 112 passing into the hydrocarbon fluid 108.

Also shown in FIG. 1 are several temperature sensors 117 mounted on the exterior surface 103 of the pipeline segment 100 for detecting temperature of the hydrocarbon fluid 108 at a given point. As well, there are several acoustic transducers 118 mounted on the exterior surface 103 of the pipeline segment 100 for detecting the flow of the hydrocarbon fluid 108 at a given point.

Pipeline System

As previously describe, a segment of pipeline may convey a hydrocarbon fluid that may be heated using an embodiment system. For example, FIG. 1 shows a hydrocarbon fluid 108 contained in pipeline segment 100. In embodiments of the present disclosure, a pipeline segment may be a portion of a larger pipeline system configured to contain or transport, or both, hydrocarbon fluid. It will be understood by those skilled in the art that the pipeline system may be used to transport the hydrocarbon fluid from a wellsite to a processing facility. Hydrocarbon fluid may be crude oil or bitumen captured and mobilized under hydrocarbon capture methods understood by those skilled in the art, including enhanced oil recovery (EOR) methods, such as steam injection and huff-and-puff. The hydrocarbon fluid may be flowing in the pipeline segment. In some embodiments, the hydrocarbon fluid may be stationary. The rate of fluid flow or lack thereof may depend on the upstream or downstream conditions in the pipeline system network.

Existing pipeline systems may be modified with embodiments of the present disclosure. Existing pipeline systems may include gas pipelines exposed to temperature fluctuations and underwater oil pipelines. Embodiments of the present disclosure may be installed as a joint between two existing pipelines.

The dimensions of embodiments of the present disclosure may vary, depending on the requirements of a given pipeline system, engineering requirements of a given project, or simulation data. The dimensions of embodiments of the present disclosure may depend on various factors and engineering requirements of a given system, including fluid volume, fluid flow rate, and field operating conditions, such as the pressure and temperature.

Conventional pipeline material comprises various metals, including steel and anticorrosive material. In some embodiments of the present disclosure, the pipeline material may comprise enabler material and metal. In some embodiments of the present disclosure, at least a portion of pipeline may be comprised of non-metallic materials. In some embodiments of the present disclosure, the pipeline, including at least a portion of the pipeline segment, may be insulated to mitigate heat loss from the pipeline and fluid contained, therein. The insulation may include refractory materials coupled to the exterior of the pipeline. Some embodiments of the present disclosure may include anticorrosive materials, particularly in the pipeline matrix or coupled with the pipeline material. The anticorrosive material may be configured to provide passage of electromagnetic energy, as well as compatibility with the temperature of the system, including the heating elements.

Embodiments of the present disclosure may include an EM transmitter comprising at least one radiation source coupled with at least one antenna. The at least one radiation source and at least one antenna may transmit the electromagnetic energy, such as radio or microwaves, from the EM transmitter. The electromagnetic energy may transmit to an intermediary, such as a heating element.

In one or more embodiments, an EM transmitter is configured to transmit electromagnetic energy into one or more heating elements. As shown in FIG. 1, each EM transmitter 113 may be configured to transmit electromagnetic energy 115 using an antenna 114 to the heating element 112. The EM transmitter may be positioned in a location on the pipeline segment wherein the electromagnetic energy from the EM transmitter is strong enough to increase the temperature of the heating element. In embodiments of the present disclosure, an EM transmitter may be coupled or connected to a heating element. In embodiments of the present disclosure, the EM transmitter may be configured to direct electromagnetic energy to more than one heating element.

The position of the EM transmitter in embodiments of the present disclosure may be determined based on an optimum energy efficiency operation of the overall system. The distance between the EM transmitter and a heating element may vary. For example, the EM transmitter may be in direct contact with a heating element in some embodiments of the present disclosure. In some embodiments of the present disclosure, the EM transmitter is positioned proximate to at least one heating element, wherein the electromagnetic energy from the EM transmitter may reach at least one heating element. In some embodiments of the present disclosure, the position of the heating element may be determined prior to determining the position of the EM transmitter.

In one or more embodiments, the EM transmitter may be positioned relative to another EM transmitter in a regular and periodic or variable and intermittent configuration. As shown in FIG. 1, the EM transmitter 113 may be positioned along the pipeline segment 100 with at least another EM transmitter 113. The distance between EM transmitters may be at equal intervals or varying intervals. In some embodiments of the present disclosure, there may be more than one EM transmitter along a given length of a pipeline segment wherein a radiation source of an EM transmitter will not interfere with the operation of a non-associated heating element. The spacing between EM transmitters may be determined by modeling and experimental data based on the flow rate, fluid properties, and type of hydrocarbon fluid, as well as the pipeline properties, such as pipe material, pipeline length, depth, diameter, and pipe connection angles, and operational requirements, such as minimum hydrocarbon flow requirement and a desired target temperature of the hydrocarbons.

EM transmitters in accordance with embodiments of the present disclosure may provide a scalable power output or a non-scalable power output. The scalability (or non-scalability) of the power output of the EM transmitter may be determined by various factors. Equipment cost, system cost, and EM transmitter reliability and performance may determine the power output of an EM transmitter. The power output of the EM transmitter may also be based on the pipeline dimensions, input fluid temperature, and the desired fluid temperature.

In embodiments of the present disclosure, a heating element may be coupled or connected to a pipeline segment. The heating element may be coupled or connected to the exterior or the interior of the pipeline segment (see interior positioning of heating element 112 in FIG. 1). The EM transmitter may transmit electromagnetic energy to the heating element, wherein the electromagnetic energy from the EM transmitter may heat an enabler material inside the heating element matrix. In embodiments wherein the heating element is coupled or connected to the interior of the pipeline segment, the composition of the pipeline segment material between the EM transmitter and the heating element, as well as any intervening layers such as insulation, a fluid layer, and anticorrosive material, may permit the transmission of the EM transmitter electromagnetic energy (waves). The heat energy in the enabler material induced by the EM transmitter may heat the heating element, wherein the heating element may heat the tube wall of the pipeline segment, as well as any solid or fluid material in direct contact with the heating element.

According to embodiments of the present disclosure, the physical configuration of the heating element may be a wide variety of shapes, including plates, collars, rings, and partial collars connected or coupled to a pipeline segment. The heating element may be configured to connect or couple radially to the pipeline segment. For example, the heating element may be a collar connected or coupled to the exterior surface of the pipeline segment. The heating element may be configured to connect or couple to a portion of the outer circumference of the pipeline segment. For example, the heating element may be a portion of a collar connected or coupled to the exterior surface of the pipeline segment. The heating element may be a plate connected or coupled to the pipeline segment. In some embodiments, the pipeline segment may be coated with a coating comprising an enabler material. In some embodiments of the present disclosure, the heating element may take the shape of the pipeline segment, where at least a portion of the pipeline segment is composed of heating element. In some embodiments of the present disclosure, the heating element may be designed to be compatible to be used as a pipeline segment having the required physical and mechanical properties.

In embodiments of the present disclosure, the heating element, such as heating element 112 in FIG. 1, may include an enabler material. In some embodiments of the present disclosure, the heating element may be composed entirely of an enabler material. In other embodiments of the present disclosure, the enabler material may be present in the heating element with other components. Enabler material may include activated carbon, carbon nanotubes, carbon black, graphene, graphite, and anode coke. Enabler material may also include composites, such as ceramics, plastics, metals, or encased fluids that are susceptible to heating by EM radiation, such as microwaves. According to embodiments of the present disclosure, enabler material may be configured to increase in temperature when exposed to electromagnetic energy, such as microwaves, from a radiation source. For example, the temperature of activated carbon may increase over 800° F. (degrees Fahrenheit) when exposed to the electromagnetic energy output of a radiation source.

The enabler material of the heating element may comprise a dielectric material, wherein the molecular dipole rotation mechanisms within the dielectric material in the presence of a radiation source increase the temperature of the enabler material. Dielectric materials are conventionally solid and include porcelain (ceramic), mica, glass, plastics, and the oxides of various metals. Liquids and gases may also serve as dielectric materials. In the embodiments with enabler material comprising ceramics, the enabler material may also comprise clays or material that contain a fluid, such as water.

The enabler material may be present with other materials in the heating element matrix. The other materials present in the matrix of the heating element may not interfere, block, impede, or impact, the ability of the enabler material to receive electromagnetic energy or to increase in temperature upon exposure to electromagnetic energy, such as the electromagnetic energy from a radiation source of an EM transmitter.

In embodiments of the present disclosure, a heating element may be coupled or connected to a surface of a pipeline. The heating element may be connected to the pipeline segment via well-appreciated connection methods, such as soldering. In some embodiments of the present disclosure, the exterior, interior, or exterior and interior of the pipeline segment may be coated with a coating comprising an enabler material.

Figure 6:
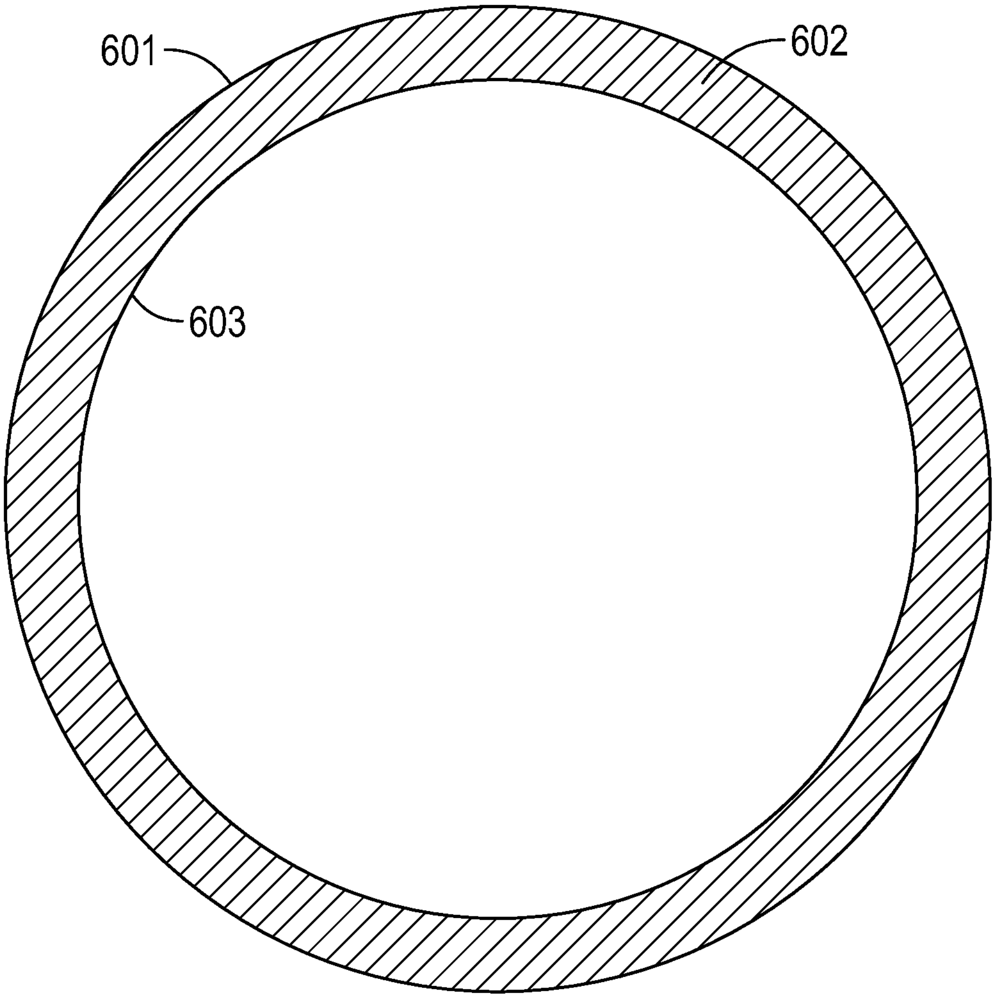
FIG. 6 shows an illustration of a pipe-in-pipe impregnated system in accordance with embodiments disclosed herein.

In some embodiments of the present disclosure, the heating element may be incorporated as part of the matrix of the pipeline segment material. For example, a heating element composed of activated carbon structures may be integrated into the pipeline segment matrix. FIG. 6 shows one such embodiment where outer pipe 603 and an inner pipe 601 are joined through heating element 602, which in this embodiment comprises activated carbon in a polymer matrix. Those of ordinary skill in the art will appreciate “pipe-in-pipe” structures are known in the art and would be suitable for embodiments herein.

In some embodiments of the present disclosure, the heating element may be positioned on an interior surface of a pipeline segment. For example, in FIG. 1 heating element 112 is connected to the interior surface 102 of the pipeline segment 100. A heating element positioned on an interior surface of a pipeline segment may allow for an area of intense and rapid heating of the hydrocarbon fluid. The heat energy may transfer along a concentrated area of contact between the heating element and hydrocarbon fluid, where the heat energy may directly pass to the hydrocarbon fluid In embodiments of the present disclosure, the heating element may be positioned on an exterior surface of a pipeline segment. A heating element positioned on an exterior surface of a pipeline segment may allow for a gradual heat transfer into the hydrocarbon fluid. The heat energy may transfer along a larger area (of the pipeline segment) as the heat energy moves from the externally-positioned heating element through the pipeline segment and into the hydrocarbon fluid, thus providing a gradual heating of the hydrocarbon fluid over a broader surface area.

In embodiments of the present disclosure, the heating element may indirectly or directly, or both, heat a hydrocarbon fluid contained in the pipeline segment. The hydrocarbons may heat to a desired target temperature (target temperature). The target temperature may be a target temperature range. The desired target temperature may be the temperature determined to reduce the viscosity of the hydrocarbons and, thus, increase the mobility of the hydrocarbons through the pipeline. The target temperature may depend on the composition of the fluid contained in the pipeline system, as well as various engineering parameters and requirements of a given pipeline system.

In some embodiments of the present disclosure, the target temperature of the hydrocarbons may induce thermal cracking. In these embodiments, the system may be designed to induce thermal cracking wherein the thermal cracking may benefit the mobilization of the hydrocarbons through the pipeline system. The target temperature, thermal cracking, as well as mitigation of fouling or coke build up, may be controlled by controlling the amount of heat delivered to the hydrocarbons, as previously described.

Embodiments of the present disclosure may include a temperature sensor. The temperature sensor may be coupled or connected to the pipeline segment (see temperature sensor 117 in FIG. 1). A temperature sensor, such as a crystal sapphire optical fiber temperature sensor, may be positioned to measure the temperature of the hydrocarbon fluid at a location upstream from the heating element. In some embodiments of the present disclosure, a temperature sensor may be positioned to measure the temperature of the hydrocarbon fluid downstream from the heating element. In some embodiments of the present disclosure, a temperature sensor may be positioned proximate to the heating element on the pipeline segment. The temperature sensor may be inserted through a port in the pipeline segment and placed in direct contact with the hydrocarbon fluid. The temperature sensor may extend through the tube wall and may be coupled to associated light processing equipment for deriving temperature of the hydrocarbon fluid. Embodiments of the present disclosure may include at least one temperature sensor positioned inside the pipeline segment.

In embodiments of the present disclosure, a temperature sensor may be used to maintain the target temperature of the hydrocarbon contained in the pipeline. For example, if the sensor measures a temperature that exceeds the target temperature of the hydrocarbons anywhere from upstream to downstream of the heating element, the electromagnetic energy from the EM transmitter may be shut off via a control system based on the sensor measurement. Embodiments of the present disclosure may also include sensors configured to collect data utilized in calculating fluctuations in system efficiency.

According to embodiments of the present disclosure, acoustic transducers may be coupled or connected to the pipeline segment (see acoustic transducer 118 in FIG. 1). The acoustic transducer may be coupled or connected to the outer surface of a pipeline segment. A signal from the acoustic transducer may be used to calculate flow characteristics inside the pipeline segment. For example, the electromagnetic energy may be adjusted via a control system based on flow measurements of an acoustic transducer according to embodiments of the present disclosure.

Embodiments of the present disclosure may include a pressure control system, such as a pumping system, coupled or connected to the pipeline system. A pumping system may include pumps and valves. Pumps and valves may aid in hydrocarbon mobility during the heating process and help maintain hydrocarbon fluid in a liquid phase to avoid a two-phase flow. Pressure control systems may also be integrated into embodiments of the present disclosure to improve safety and stability of the system.

Embodiments of the present disclosure may include monitoring and control mechanisms to maintain a desired resonance mode and a desired heating efficiency or a desired fluid temperature during the heating process. Monitoring and control mechanisms may include fiberoptic and wireless transmission technology appreciate understood by those skilled in the art with the benefit of this disclosure.

Thermal reactions of the heating process may be controlled by flowing the hydrocarbon fluid in a liquid phase through the pipeline segment. In embodiments of the present disclosure, the hydrocarbon fluid may enter a pipeline segment, flow through the pipeline segment past a heating element, and exit the pipeline segment. As the hydrocarbon fluid flows through the pipeline segment, heat from the heating element may be transferred into the hydrocarbon fluid. The exposure to the heat from the heating element via conduction, among other heat transfer mechanisms, may lead to heating of the hydrocarbon fluid. The peak rate of heating may occur in a portion of the hydrocarbon fluid that passes proximate to each heating element. After heat is absorbed by the portion of the hydrocarbon fluid proximate to the heating element, the heat may then transfer into the bulk hydrocarbon fluid through natural fluid dynamics, where the temperature of the bulk hydrocarbon fluid then is elevated from its previous temperature.

The spacing of heating elements on the pipeline segment may be at regular intervals (that is, periodic or at fixed spacing), varied (that is, intermittent), or both. In some embodiments, the distance between each heating element is a fixed interval as measure along the axial direction of the pipeline. In some other embodiments, the distance between each heating element is a non-fixed interval as measured along the axial direction of the pipeline. In some embodiments of a system, the distance between each heating element is a combination of varied and fixed intervals. For example, a system may be envisioned having several heating elements, each having a different distance between each other, positioned at the start of a pipeline. Such a non-linear spacing configuration may assist in slowly yet safely contributing heat into a cold yet flowing fluid. As the fluid begins to approach a target flow viscosity, the heating elements may be spaced further apart downstream in such a configuration. As the target flow viscosity value or range is achieved, the interval of heating elements may be configured at a fixed distance from one another, having achieved a fluid that is warmer and less viscous than from when it was introduced into the pipeline while also accounting for a gradual loss of energy and resultant increase in viscosity. A person of ordinary skill in the art may use standard calculations, such as fluid modeling, experience and reasonable experimental work based on expected fluid flow rate, fluid properties, such as heat capacity, composition of the fluid, and pipeline properties, such as heat transfer value, among other factors, to determine an appropriate configuration of heating elements for a given pipeline system to achieve a target viscosity profile along the length of the pipeline system.

A radiation source of an EM transmitter according to embodiments of the present disclosure may include instruments configured to induce dielectric heating in an enabler material. Dielectric heating is the process where an electromagnetic frequency, such as radio frequency alternating electric field, radio wave or microwave electromagnetic radiation, heats a dielectric material, such as an enabler material according to embodiments of the present disclosure. The EM transmitter may be configured to direct the radiation waves to an enabler material, wherein the heated enabler material may heat an associated heating element coupled or connected to a portion of a hydrocarbon bearing pipeline segment, hydrocarbon fluid, or both. Examples of radiation sources of EM transmitter according to embodiments of the present disclosure may include commercially available industrial microwave transmission units.

The electromagnetic energy generated and supplied by the radiation source of the EM transmitter may be centered at a predefined frequency and may be designed based on the specific flow rate requirements of the system and other engineering design parameters. The electromagnetic energy may be directed at an enabler material within a heating element positioned at a target pipeline section of a pipeline system. The target pipeline section is defined as the area identified for a reduction in hydrocarbon fluid viscosity (see pipeline segment 100 in FIG. 1).

In embodiments of the present disclosure, the position of the EM transmitter, enabler material, and pipeline segment may be configured in a manner to minimize electromagnetic energy reflection, thereby allowing the maximum amount of electromagnetic energy to heat the enabler material.

In some embodiments of the present disclosure, residence time may be considered when designing the EM transmitter parameters, enabler material composition, and length of pipeline segment necessary to reach a desired temperature of the hydrocarbon.

In embodiments of the present disclosure, the enabler material may have a composition that supports heating to temperatures greater than 800° C. (degrees Celsius). In the presence of electromagnetic energy, such as microwaves, the temperature of the enabler material may increase greater than 800° C., where the heat from the enabler material may radiate into a hydrocarbon fluid. In some embodiments of the present disclosure, the electromagnetic radiation may increase the temperature of the enabler material to values that are known to cause non-catalytic thermal cracking of hydrocarbons, such as in a range of from about 400° C. to 460° C. Embodiments of the present disclosure may use temperature control mechanisms to control degree of thermal cracking of the hydrocarbons.

In some embodiments of the present disclosure, thermal cracking of the hydrocarbons may facilitate the mobilization of the hydrocarbons flowing through the pipeline segment. The degree of thermal cracking may be controlled by controlling the temperature of the hydrocarbons. The temperature of the hydrocarbons may be controlled by controlling the amount of heat delivered to the pipeline segment. The amount of heat delivered to the pipeline segment may be controlled by controlling the electromagnetic energy from the EM transmitters, the length of the pipe segment connected or coupled to enabler material, and amount of time the hydrocarbons are exposed to the electromagnetic energy of the EM transmitters.

In some embodiments of the present disclosure, the hydrocarbons may be heated to below the visbreaking temperature. In these embodiments, the viscosity reduction may be reversible. Additional heating systems, including embodiments of the present disclosure, as well thermal jackets, may be installed along the pipeline system to maintain viscosity reduction of the hydrocarbon.

The overall pipeline system may utilize one or more heating systems according to embodiments of the present disclosure to heat the fluid in the pipeline to desired specifications, including a target temperature. A heating system may comprise a heating element coupled with a hydrocarbon containing pipeline coupled with an EM transmitter. The heating systems according to embodiments of the present disclosure may be singular systems or a series of systems configured at various intervals of distance between heating elements along the axial direction of the pipeline.

Figures 2A, 2B, 2C:
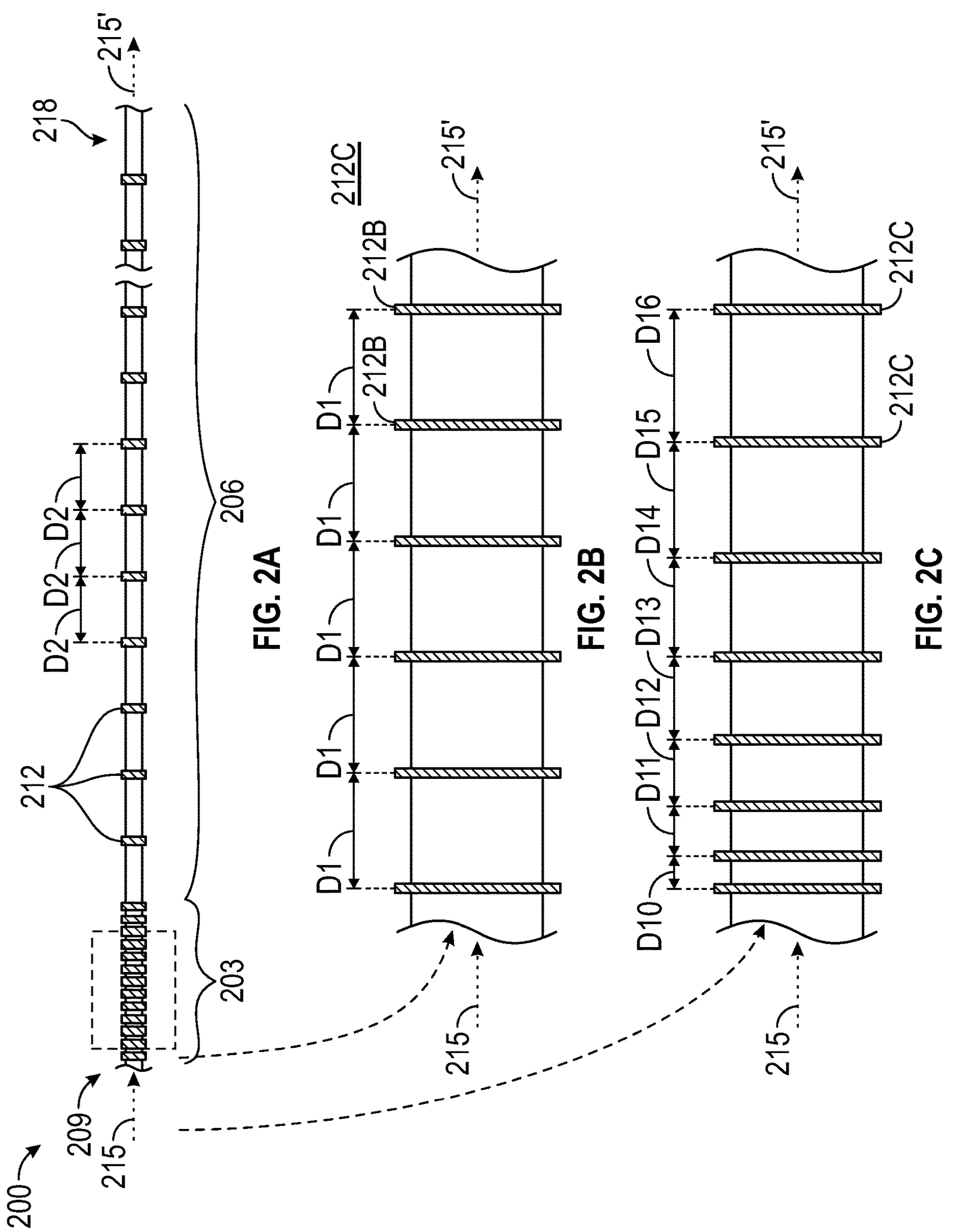
FIG. 2A shows an illustration of an overall view of a pipeline system with several heating systems for heating a hydrocarbon fluid.
FIG. 2B shows an illustration of heating systems separated by a fixed distance in a heating zone of a pipeline system.
FIG. 2C shows an illustration of heating systems spaced at varying distances in a heating zone of a pipeline system.

FIG. 2A shows an illustration of an overall view of a pipeline system with a series of heating systems for heating a hydrocarbon fluid. FIG. 2A shows a pipeline system 200 with a heating zone 203 and a maintenance zone 206. The heating zone 203, located at the entry 209 of the pipeline system, includes heating systems 212 spaced along the length of the pipeline system 200. The maintenance zone 206 includes heating systems 212 spaced at repeating fixed distance D2, until the end 218 of the pipeline system 200. The pipeline system 200 includes a conduit (not shown) through which a cold hydrocarbon fluid 215 may traverse or flow through the entry 209 of the pipeline system, through the heating zone 203, through the maintenance zone 206, and to the end 218 of the pipeline system where a heated hydrocarbon fluid 215' exits the pipeline system 200.

In embodiments of the present disclosure, cold and viscous hydrocarbon fluid may flow into a heating zone of a pipeline system. The heating zone of a pipeline system may include a series of heating systems spaced at intervals determined to increase the temperature of the hydrocarbon fluid to a target temperature, or target temperature range, as the hydrocarbon fluid passes the series of heating systems. Once the hydrocarbon fluid reaches a target temperature, or temperature range, it may flow through a maintenance zone of a pipeline system, where the heating systems may be spaced at intervals determined to maintain the temperature of the hydrocarbon fluid in the target temperature range.

According to embodiments of the present disclosure, a heating zone in a pipeline system may include heating systems spaced at a repeating fixed distance. As shown in FIG. 2B, heating systems 212B are separated by a fixed distance D1, where the fixed distance D1 is less than the fixed distance D2 in FIG. 2A. In pipeline systems with heating systems in a heating zone spaced at fixed distances, the level of heat output by each heating system may vary as the temperature of a hydrocarbon fluid passing each heating system is increased to a target temperature range. Heating systems according to embodiments of the present disclosure may be connected to a single power source or multiple power sources.

According to embodiments of the present disclosure, a heating zone in a pipeline system may include heating systems spaced at intermittent distances. As shown in FIG. 2C, heating systems 212C are spaced at varying distances D10, D11, D12, D13, D14, D15, and D16, where D10-D16 are less than the fixed distance D2 in FIG. 2A. In some embodiments of the present disclosure, the spacing between each heating system in a heating zone may be increasing intermittent spacing. For example, as shown in FIG. 2C, D11 is greater than D10, D12 is greater than D11, and so on. The varying distances between heating systems, such as D10-D16, may be determined using mathematical equations and simulation models understood by those in the art. In pipeline systems with heating systems in a heating zone spaced at varying distances, the level of heat output by each heating system may be similar as the temperature of a hydrocarbon fluid passing each heating system is increased to a target temperature range.

According to embodiments of the present disclosure, a maintenance zone in a pipeline system may include a series of heating systems. The heating systems in the maintenance zone may be spaced at distances where the heat output of each heating system may maintain the temperature of a heated hydrocarbon fluid at a target temperature or in target temperature range. In some embodiments, the distance between each heating system in the maintenance zone may be a fixed distance (for example, D1 in FIG. 2A). In some embodiments, the amount of energy transferred into the hydrocarbon fluid by each eachting system is fixed.

Method of System Use

The pipeline system, such as pipeline system 1000 of FIG. 1, may be used to increase the temperature of a hydrocarbon fluid passing through it, thereby reducing the viscosity of the hydrocarbon fluid, which may yield a number of operational benefits as previously described. As shown in method 300 in FIG. 3, embodiments of the current disclosure may include methods of heating a viscous fluid contained in a pipeline. Methods according to embodiments of the present disclosure may be applied to fluids transported in container systems, such as hydrocarbon fluids transported in pipelines. It will be understood by those skilled in the art that while the current disclosure describes heating of hydrocarbon fluids in pipelines, embodiments of the current disclosure may be used to reduce the viscosity to transport a wide variety of heavy, reduced-mobility fluids. It will also be understood by those skilled in the art that embodiments of the current disclosure may include a wide range of fluid flow rates through a pipeline as well as stationary fluids in a pipeline.

Figure 3:
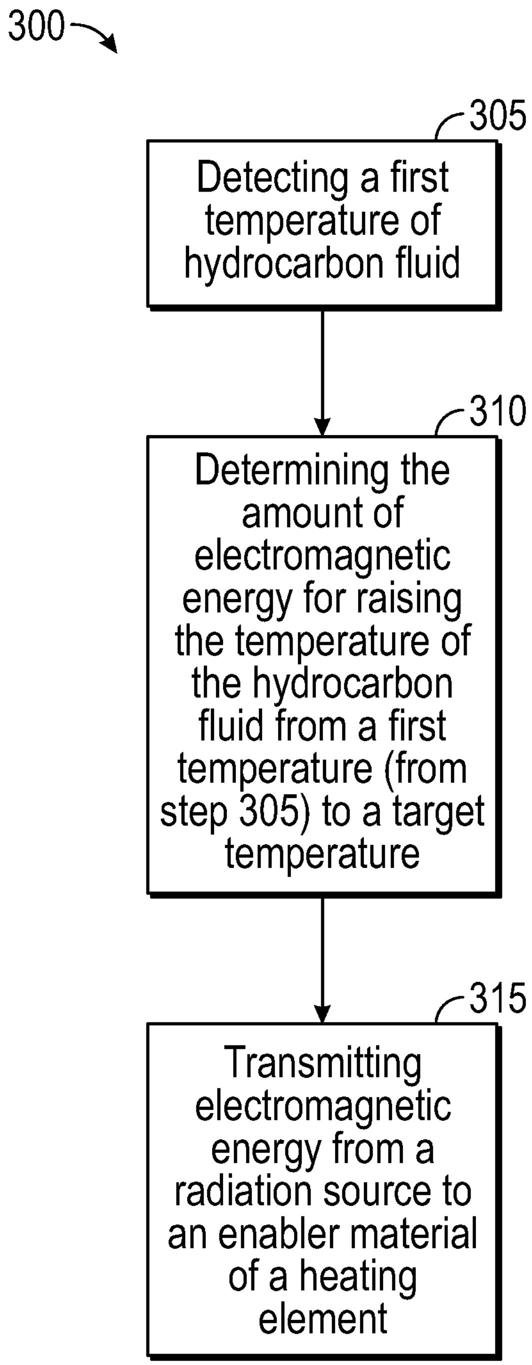
FIG. 3 shows a method of heating a hydrocarbon fluid in accordance with at least one embodiment of the present disclosure.

In embodiments of the present disclosure, properties of a fluid in a pipeline system may be detected or determined. For example, as shown in FIG. 3, step 305 shows that the first temperature of the hydrocarbon fluid is detected. In some embodiments, the temperature of the fluid may be used to determine the viscosity of the fluid. The properties of the fluid may be detected prior to introducing the fluid into a pipeline, while in the pipeline, or both. For example, a hydrocarbon fluid temperature at the wellsite may be measured and collected in preparation for transport within a pipeline. In some embodiments of the present disclosure, the fluid properties may be detected while the fluid is in transit. For example, the temperature of a hydrocarbon fluid may be detected within a pipeline while the hydrocarbon is flowing in the pipeline or being held in the pipeline. In some embodiments, the fluid flow rate may be detected within a pipeline while the hydrocarbon is flowing in the pipeline. These properties may be measured via temperature sensors, acoustic transducers and other detection means and determination methods understood by those skilled in the art.

In some embodiments of the present disclosure, if one fluid parameter is known, such as temperature, additional parameters may be calculated for a given fluid using known correlations, simulations, and models. For example, the Lohrenz-Bry-Clark and Corresponding State Principle may be used to determine fluid parameters, such as fluid composition, density, molecular weight, and temperature, without directly measuring each parameter. For example, embodiments of the present disclosure may use a measured temperature of a hydrocarbon to estimate the viscosity of the hydrocarbon.

Embodiments of the present disclosure may include determining the difference between the temperature of the hydrocarbon fluid and a target temperature for the hydrocarbon fluid in the pipeline system. Embodiments of the present disclosure may also include determining the difference between the flow velocity of the hydrocarbon fluid and a target flow velocity for the hydrocarbon fluid in a pipeline system. Embodiments of the present disclosure may also include determining the difference between the viscosity of the hydrocarbon fluid and a target viscosity for the hydrocarbon fluid in the pipeline system. In some embodiments of the present disclosure, the target temperature, target flow velocity, and target viscosity may be a target range temperature, target range flow velocity, and a target range viscosity.

Determining an amount of energy for raising the temperature of the hydrocarbon fluid in the pipeline system may be part of an embodiment method. As shown in step 310 in FIG. 3, embodiments of the present disclosure may include determining the amount of electromagnetic energy for raising the temperature of the hydrocarbon fluid from a first temperature (from step 305) to a target temperature. The target temperature may be greater than the initial temperature of the hydrocarbon fluid.

In some embodiments of the present disclosure, a target temperature may be used to determine the amount of electromagnetic energy output. The amount out electromagnetic energy output required to increase a hydrocarbon temperature to the target temperature may be determined with simulation models.

According to embodiments of the present disclosure, factors used to determine the amount of heat introduced at a given pipeline location may include fluid flow, incoming fluid temperature, distance between the EM transmitter and heating element used to determine the amount of heat introduced at a given location, and distance between the heating element and the subsequent EM transmitter. Post-flow monitoring may be used to determine the amount of heat introduced at a given location, as determined by simulation models.

Transmitting energy into a heating element from a radiation source of an EM transmitter may be part of an embodiment method. Embodiments of the present disclosure may include determining the amount of heat to emit from the heating element to raise the temperature, raise the flow velocity, or lower the viscosity to the target temperature. Embodiments of the present disclosure may include determining an amount of electromagnetic radiation to produce in an EM transmitter to generate the amount of heat to emit to reach the target temperature. Embodiments of the present disclosure may include transmitting the amount of electromagnetic radiation from an EM transmitter to a heating element. Embodiments of the present disclosure may include the use of a feedback loop, where the steps of determining the amount of heat to emit from the heating element to raise the temperature, raise the flow velocity, or lower the viscosity to the target temperature, determining an amount of electromagnetic radiation to produce in an EM transmitter to generate the amount of heat to emit to reach the target temperature, and transmitting the amount of electromagnetic radiation from an EM transmitter to a heating element may be repeated until the hydrocarbon reaches the target temperature.

As shown step 315 in FIG. 3, and according to embodiments of the present disclosure, an EM transmitter may transmit electromagnetic radiation to an enabler material of a heating element. In some embodiments of the present disclosure, the EM transmitter may deliver microwave radiation at a resonant frequency.

The radiation source may transmit electromagnetic energy to the enabler material in the heating element, wherein the temperature of the enabler material in the heating element will increase. The temperature of the enabler material in the heating element increases because the enabler material becomes excited by the transmitted electromagnetic waves and generates heat. As the temperature of the enabler material increases, the heat from the enabler material radiates in the heating element. The heating element, coupled or connect to a hydrocarbon bearing pipeline, will increase the temperature of the pipeline and a fluid contained therein, such as a hydrocarbon fluid. Embodiments of the present disclosure may include detection of the fluid flow in the hydrocarbon bearing pipeline. Some embodiments of the present disclosure may include detection of temperature of the heated fluid in the pipeline.

In embodiments of the present disclosure, the temperature of the hydrocarbon fluid may be controlled by adjusting the electromagnetic energy wave frequency. Adjustment in the electromagnetic energy wave frequency may impact the temperature change of the enabler material, which may impact the temperature change of the hydrocarbon fluid. Adjustments in the heat output of the enabler material by adjusting the electromagnetic energy output may be used to reduce the hydrocarbon viscosity and aid in mobility. For example, the temperature of the enabler material may be increased to conduct additional heat to the fluid, thereby reducing the viscosity of the fluid. Alternatively, the radiation source may be adjusted so that the temperature of the enabler material may be reduced if viscosity measurements indicate a high percent of conversion of the hydrocarbon fluid.

In embodiments of the present disclosure, the adjustment in heat conducted to the hydrocarbon fluid may be a progressive method wherein downstream heating systems may increase or decrease heat output to the hydrocarbon fluid to reach or maintain a target temperature, target flow velocity, or target viscosity, or any combination thereof. In some embodiments of the present disclosure, the target temperature, target flow velocity, or target viscosity, or any combination thereof, may vary for each heating system on a pipeline system. In some embodiments of the present disclosure, a heating system may receive data from at least one other heating system via data communication systems such as Supervisory Control and Acquisition. The heating systems may use data from other heating systems to adjust frequencies of the electromagnetic energy. In some embodiments of the present disclosure, electromagnetic radiation may be emitted from a radiation source of an EM transmitter until one or all of the target ranges (temperature, flow velocity, viscosity) of the hydrocarbon fluid are satisfied.

In addition to the advantages associated with transporting a low viscosity hydrocarbon, embodiments of the present disclosure may reduce or prevent the wax and scale formation and precipitation within a pipeline system while transporting hydrocarbon fluids. Temperature reduction during transportation of hydrocarbon fluids is a common cause of wax and scale formation and precipitation. Wax solubility in hydrocarbon fluids decreases as the temperature of the hydrocarbon fluid decreases. Scaling is also commonly driven by decreasing hydrocarbon temperature. Embodiments of the present disclosure may prevent a decrease in hydrocarbon temperature and large temperature fluctuations by controlling the heating of hydrocarbons in a pipeline via heating elements.

In embodiments of the present disclosure, the heated enabler material may not be in direct contact with the pipeline material or the hydrocarbon fluid in the pipe. It will be understood by those skilled in the art that embodiments of the present disclosure the heat energy from the enabler material may radiate to the hydrocarbon fluid via conduction, convention, or both heat transfer mechanisms.

Figure 4:
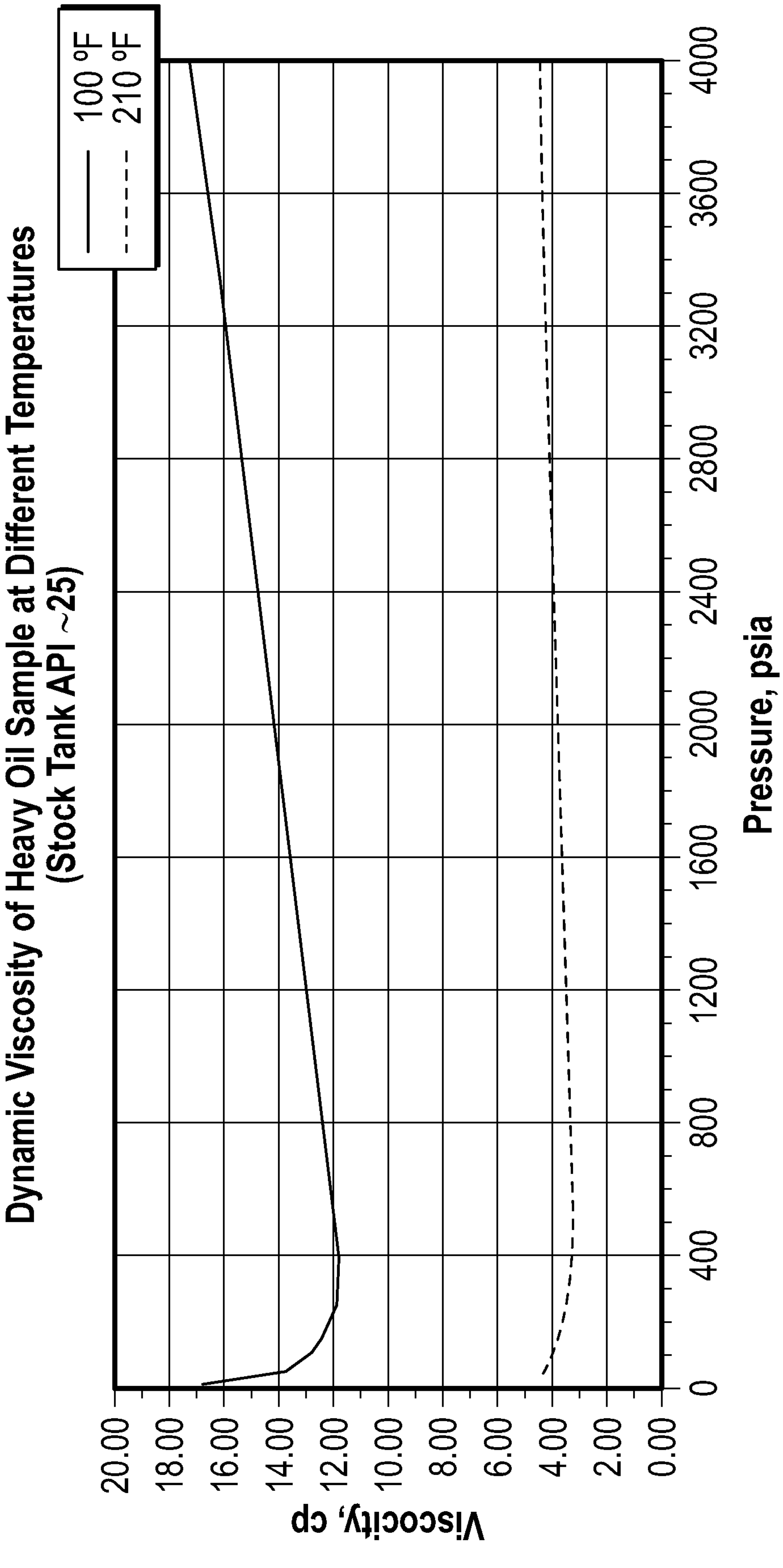
FIG. 4 shows a graphical representation of the change in dynamic viscosity of heavy oil at 100° F. and 210° F. at varying pressure.

Embodiments of the present disclosure may reduce the viscosity of a hydrocarbon fluid contained in a pipeline wherein heat from an electromagnetically heated enabler material increases the temperature of the hydrocarbon fluid. As shown in FIG. 4, experimental dynamic viscosity data suggest a reduction of more than 70% in dynamic viscosity by increasing temperature of heavy oil from 100° F. to 210° F. across a range of different pressures, such as about 0 to about 4000 psia (pounds per square inch absolute).

Figure 5:
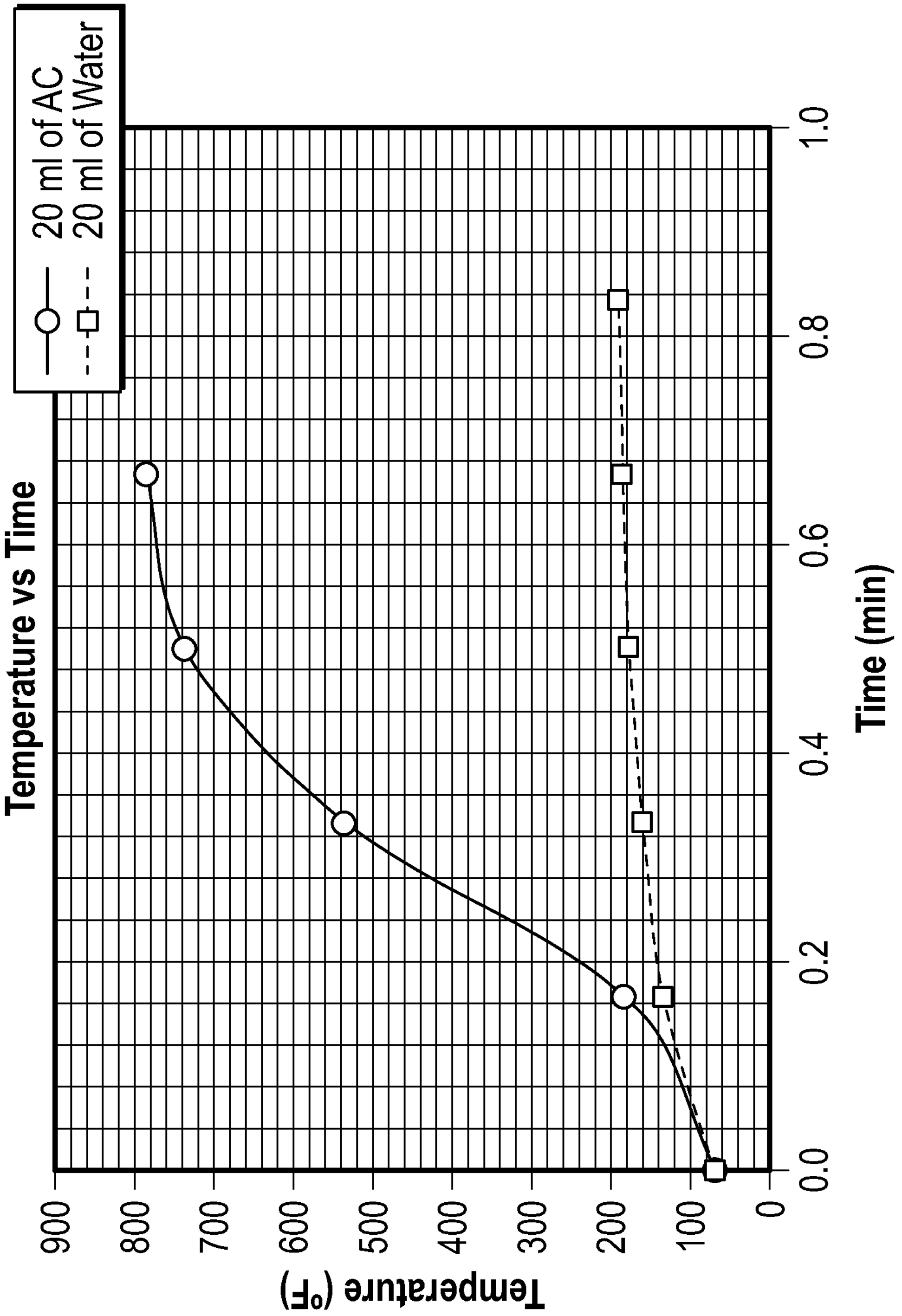
FIG. 5 shows a graphical representation of the temperature change of activated carbon and water exposed to microwave radiation.

Embodiments of the present disclosure may include activated carbon as an enabler material of a heating element. An evaluation of activated carbon heating properties using microwave radiation are shown in FIG. 5. The experiment was performed to compare the heating capacity of activated carbon and water. In the experiment, 20 ml (milliliters) of activated carbon (powder) and 20 ml of water were exposed to microwaves (2.45 GHz) in a conventional industrial microwave oven. As shown in the graph, the activated carbon reached 800° F. in less than a minute while the temperature of the water, considered to be a good microwave absorber, increased to 200° F. in the same period. This experiment demonstrates the thermal properties of the activated carbon and its ability to heat up when subjected to microwaves.

Embodiments of the present disclosure may also be useful to heat fluids for further processing, such as sterilization, chemical modification, and viscosity reduction.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A system for facilitating hydrocarbon fluid flow, the system comprising:

a tubular segment having a length, a tube wall with a thickness, a tube wall exterior surface, and a tube wall interior surface, where the tube wall interior surface defines an interior fluid conduit configured to permit the flow of a hydrocarbon fluid along the length of the tubular segment, and where the tube wall comprises a material that is configured to convey heat energy through the tube wall;

a series of heating elements coupled to an interior surface of the tube wall along the length of the tubular segment, where each heating element comprises an enabler material that is configured to receive electromagnetic energy, convert the electromagnetic energy into heat energy, and release the heat energy into the tube wall; and at least one source of electromagnetic energy associated with each heating element, where the at least one source of electromagnetic energy is configured to transmit electromagnetic energy into the associated heating element, wherein the series of heating elements comprises a plurality of heating elements in a heating zone and a plurality of heating elements in a maintenance zone, wherein the heating elements in the heating zone are spaced at a first repeating fixed distance at an entry of the tubular segment for increasing a temperature of the hydrocarbon fluid to a target temperature, and wherein the heating elements in the maintenance zone are spaced at a second repeating fixed distance that is greater than the first repeating fixed distance for maintaining the temperature of the hydrocarbon fluid.

2. The system of claim 1, wherein the enabler material is a dielectric material.

3. The system of claim 2, wherein the enabler material comprises activated carbon.

4. The system of claim 1, wherein the tube wall is in direct contact with a hydrocarbon fluid.

5. The system of claim 1, further comprising a temperature sensor.

6. The system of claim 1, further comprising at least one acoustic transducer.

7. The system of claim 1, wherein the material of the tube wall comprises a dielectric material.

8. The system of claim 7, wherein the material of the tube wall comprises activated carbon.

9. The system of claim 1, wherein the at least one source of electromagnetic energy is configured to transmit microwave radiation.

10. The system of claim 1, wherein the at least one source of electromagnetic energy is configured to increase the hydrocarbon fluid to a target temperature.

11. The system of claim 1, further comprising a control system.

12. A method of facilitating hydrocarbon fluid flow, the method comprising:

introducing a hydrocarbon fluid into a tubular segment of a system for facilitating hydrocarbon fluid flow;

detecting a first temperature of the hydrocarbon fluid using a sensor in an interior fluid conduit of the tubular segment;

determining a first viscosity of the hydrocarbon fluid in the interior fluid conduit using the detected first temperature;

determining an amount of electromagnetic energy for raising the temperature of the hydrocarbon fluid from a first temperature to a target temperature, where the target temperature is greater than the first temperature; and transmitting electromagnetic energy from at least one source of electromagnetic energy into an associated at least one heating element such that the temperature of the hydrocarbon fluid is raised downstream of the at least one heating element.

13. The method of claim 12, further comprising detecting a second temperature of the hydrocarbon fluid using a second sensor downstream of the at least one heating element.

14. The method of claim 12, wherein the tubular segment comprises a dielectric material.

15. The method of claim 14, wherein the tubular segment comprises activated carbon.

16. The method of claim 12, further comprising maintaining the target temperature.

17. The method of claim 12, further comprising determining the amount of heat to emit from the heating element to raise the temperature to the target temperature.

18. The method of claim 12, further comprising maintaining the target temperature with a feedback loop.

* * * * *